United States Patent
Lalwala et al.

(10) Patent No.: US 11,981,280 B1
(45) Date of Patent: May 14, 2024

(54) RESTRAINT SYSTEM TO PREVENT KNEE HYPEREXTENSION DURING VEHICLE CRASHES

(71) Applicant: GM Global Technology Operations LLC, Detroit, MI (US)

(72) Inventors: Mitesh Lalwala, Troy, MI (US); Manuel Forero Rueda, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/189,382

(22) Filed: Mar. 24, 2023

(51) Int. Cl.
  *B60R 21/02* (2006.01)
  *B60R 21/013* (2006.01)
  *B60R 21/015* (2006.01)

(52) U.S. Cl.
  CPC ........... *B60R 21/02* (2013.01); *B60R 21/013* (2013.01); *B60R 21/01516* (2014.10); *B60R 21/01538* (2014.10); *B60R 2021/022* (2013.01)

(58) Field of Classification Search
  CPC ...... B60R 2021/0053; B60R 2021/022; B60R 21/02
  See application file for complete search history.

(56) References Cited

U.S. PATENT DOCUMENTS

| | | | | |
|---|---|---|---|---|
| 3,591,232 A | * | 7/1971 | Simon | ............ B60R 21/02 296/68.1 |
| 10,525,922 B1 | * | 1/2020 | Lin | ............ B60R 21/2338 |
| 2022/0355758 A1 | * | 11/2022 | Freisler | ............ B60R 21/233 |
| 2022/0410832 A1 | * | 12/2022 | Kang | ............ B60R 21/01 |

FOREIGN PATENT DOCUMENTS

| | | | | |
|---|---|---|---|---|
| DE | 4002448 A | * | 8/1990 | ............ B60R 21/02 |
| DE | 102017212135 A1 | * | 1/2019 | |
| JP | 2020001681 A | * | 1/2020 | ............ B60N 2/4214 |

OTHER PUBLICATIONS

Fukurono et al., Seating Device, Jan. 9, 2020, EPO, JP 2020-001681 A, Machine Translation of Description (Year: 2020).*
Laszig et al., Safety appts. for vehicle passengers of varying size and weight—has automatic positioning and energy adsorption of knee-pad restraint system which protects lower limbs on impact, Aug. 23, 1990, EPO, DE 40 02 448 A1, Machine Translation of Description (Year: 1990).*
Freienstein et al., Restraint device for a vehicle, EPO, Jan. 17, 2019, EPO, DE 10 2017 212 135 A1, Machine Translation of Description (Year: 2019).*

* cited by examiner

*Primary Examiner* — James A English
(74) *Attorney, Agent, or Firm* — Vivacqua Crane, PLLC (57) ABSTRACT

A vehicle seat restraint system includes a vehicle seat of a vehicle. The vehicle seat includes a leg-rest supporting lower legs and feet of an occupant of the vehicle seat. An in-vehicle occupant detection system identifies positions of the lower legs and the feet of the occupant. A restraint actuator is connected to the vehicle seat. A safety restraint element is extended by actuation of the restraint actuator from a stowed position proximate to the leg-rest into an engaged position wherein the safety restraint element contacts and restrains the lower legs and the feet of the occupant against the leg-rest, mitigating against occupant knee hyperextension due to leg straightening at an occupant knee joint.

15 Claims, 5 Drawing Sheets

RESTRAINT SYSTEM TO PREVENT KNEE HYPEREXTENSION DURING VEHICLE CRASHES

INTRODUCTION

The present disclosure relates to vehicle occupant restraint systems.

Hyperextension of the knee, also known as "genu recurvatum" occurs when the leg excessively straightens at the knee joint, putting stress on the knee structures and the back of the knee joint. Vehicle occupant knee hyperextension may occur during an automotive crash when sudden vehicle deceleration causes occupant legs to rotate forward and upward and may lead to knee ligament injuries. Additionally, knee hyperextension can cause secondary injuries due to interaction between occupant lower extremities and the occupant's head and chest, and interaction of occupant extremities with vehicle interior components or with other occupants of the vehicle. Vehicle airbag systems may reduce overall occupant head and chest acceleration but may not sufficiently reduce leg and knee hyperextension.

Thus, while current systems and methods to protect vehicle occupants during automotive crashes achieve their intended purpose, there is a need for a new and improved system and method to prevent or mitigate knee hyperextension.

SUMMARY

According to several aspects, a vehicle seat restraint system includes a vehicle seat of a vehicle. The vehicle seat includes a leg-rest supporting lower legs and feet of an occupant of the vehicle seat. An in-vehicle occupant detection system identifies positions of the lower legs and the feet of the occupant. A restraint actuator is connected to the vehicle seat. A safety restraint element is extended by actuation of the restraint actuator from a stowed position proximate to the leg-rest into an engaged position wherein the safety restraint element contacts and restrains the lower legs and the feet of the occupant against the leg-rest, mitigating against occupant knee hyperextension due to leg straightening at an occupant knee joint.

In another aspect of the present disclosure, the restraint actuator defines one of a pyro technic actuator, a torsion spring and a solenoid. Activation of the restraint actuator is initiated by one or more crash sensors located in the vehicle.

In another aspect of the present disclosure, first and second extending links are connected to the restraint actuator, adjusted in length using data retrieved from the in-vehicle occupant detection system and rotated by activation of the restraint actuator. The safety restraint element defining a net is initially positioned in a rolled condition at an end of the foot-rest. Rotation of the first and second extending links in a first rotational direction unrolls the safety restraint element, sweeping the safety restraint element over the feet and into contact with the lower legs of the occupant.

In another aspect of the present disclosure, first and second extending links connected to the restraint actuator are adjusted in length using data retrieved from the in-vehicle occupant detection system and rotated by activation of the restraint actuator. The safety restraint element defining a flexible belt is connected at opposite ends to the first and second extending links and positioned below the feet in a stowed position at an end of the foot-rest. Rotation of the first and second extending links in a first rotational direction co-rotates the safety restraint element, sweeping the safety restraint element over the feet and into contact with the lower legs of the occupant.

In another aspect of the present disclosure, a U-shaped bar has a first link connected to the restraint actuator, a second link connected to the first link and a third link connected to the second link. The U-shaped bar is rotated about an axis of rotation of the first link by activation of the restraint actuator. The restraint actuator is connected to a rear face of the leg-rest and at a location centrally disposed between the lower legs of the occupant. A height of the first link and the third link are adjusted, and a width of the second link is adjusted using data retrieved from the in-vehicle occupant detection system. A rolled belt defining the safety restraint element is connected to a side of the leg-rest at a first end of the safety restraint element and is connected to the third link at a second end of the safety restraint element. The restraint actuator rotates the U-shaped bar about a central axis of the first link to sweep the safety restraint element across the lower legs of the occupant.

In another aspect of the present disclosure, a U-shaped bar has a first link connected to the restraint actuator and is positioned at a first side of the leg-rest, a second link connected to the first link and a third link connected to the second link and positioned at a second side of the leg-rest at the stowed position of the safety restraint element. A height of the first link and the third link is adjusted, and a width of the second link is adjusted using data retrieved from the in-vehicle occupant detection system. A rolled belt defining the safety restraint element is connected to the third link. The restraint actuator rotates the U-shaped bar about a central axis of the first link and across the lower legs to sweep the safety restraint element from the stowed position across the lower legs of the occupant.

In another aspect of the present disclosure, a locking device releasably locks the safety restraint element in the engaged position.

In another aspect of the present disclosure, a release device is actuated to release the locking device and thereby release the safety restraint element from the engaged position and allowing egress of the occupant out of the vehicle seat.

In another aspect of the present disclosure, the in-vehicle occupant detection system includes at least one of a vehicle camera, at least one seat pressure sensor and at least one seat contact sensor.

In another aspect of the present disclosure, a feedback from the in-vehicle occupant detection system is applied to identify a potential location of the lower legs and the feet. An extending link is connected to the foot-rest. A length of the extending link and an angle of rotation of the extending link is adjusted applying the potential location to accommodate a height of the feet and a position of the lower legs.

According to several aspects, a vehicle seat system mitigating occupant knee extension includes a vehicle seat having a leg-rest supporting lower legs and feet of an occupant of the vehicle seat. An in-vehicle occupant detection system has at least one camera directed toward the occupant and generating camera signals identifying positions of the lower legs, a length of the lower legs and a size of the feet of the occupant. At least one restraint actuator is connected to the leg-rest of the vehicle seat. A safety restraint element has a position of the safety restraint element adjusted using data collected from the in-vehicle occupant detection system. The safety restraint element is extended from a stowed position proximate to the leg-rest into an engaged position wherein the safety restraint element contacts and restrains the lower legs and the feet of the occupant against the leg-rest. A locking device releasably locks the safety restraint element in the engaged position.

In another aspect of the present disclosure, the camera is directed at lower portions of the occupant including the lower legs and the feet below knee joints of the occupant.

In another aspect of the present disclosure, a crash sensor located in the vehicle, wherein activation of the crash sensor triggers the restraint actuator to extend the safety restraint element.

In another aspect of the present disclosure, a contact sensor of the in-vehicle occupant detection system sensing if the lower legs and the feet are in contact with the leg-rest.

In another aspect of the present disclosure, the safety restraint element includes: a padded rope/belt swung by the restraint actuator from a stowed position behind or beneath the leg-rest outward and beyond the feet; and at least one weight member connected to the padded rope/belt influencing the padded rope/belt to swing in a first arc of rotation.

In another aspect of the present disclosure, the restraint actuator includes: a first mechanism fixed to a first side of the leg-rest and connected to a first end of the padded rope/belt; and a second mechanism fixed to a second side of the leg-rest and connected to a second end of the padded rope/belt.

In another aspect of the present disclosure, the safety restraint element in the engaged position restrains the lower legs for any angle of rotation of the seat back with respect to the seat base between a seat upright position and a seat reclined position.

According to several aspects, a method to mitigate vehicle occupant knee hyperextension, comprises: supporting lower legs and feet of an occupant of a vehicle seat using a leg-rest connected to the vehicle seat; identifying positions and sizes of the lower legs and the feet of the occupant using an in-vehicle occupant detection system; connecting a restraint actuator to the vehicle seat; mounting a safety restraint element in a stowed position proximate to the leg-rest; and actuating the restraint actuator to extend the safety restraint element from the stowed position into an engaged position wherein the safety restraint element contacts and restrains the lower legs and the feet of the occupant against the leg-rest, mitigating against occupant knee hyperextension due to leg straightening at an occupant knee joint.

In another aspect of the present disclosure, the method further includes: connecting first and second extending links to the leg-rest; and adjusting a length of the extending links using data retrieved from the in-vehicle occupant detection system to accommodate different positions and sizes of the lower legs and the feet of the occupant.

In another aspect of the present disclosure, the method further includes: actuating a locking device to releasably lock the safety restraint element when the safety restraint element reaches the engaged position; and operating a release device to release the locking device and thereby release the safety restraint element from the engaged position to allow egress of the occupant out of the vehicle seat.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1, 2:
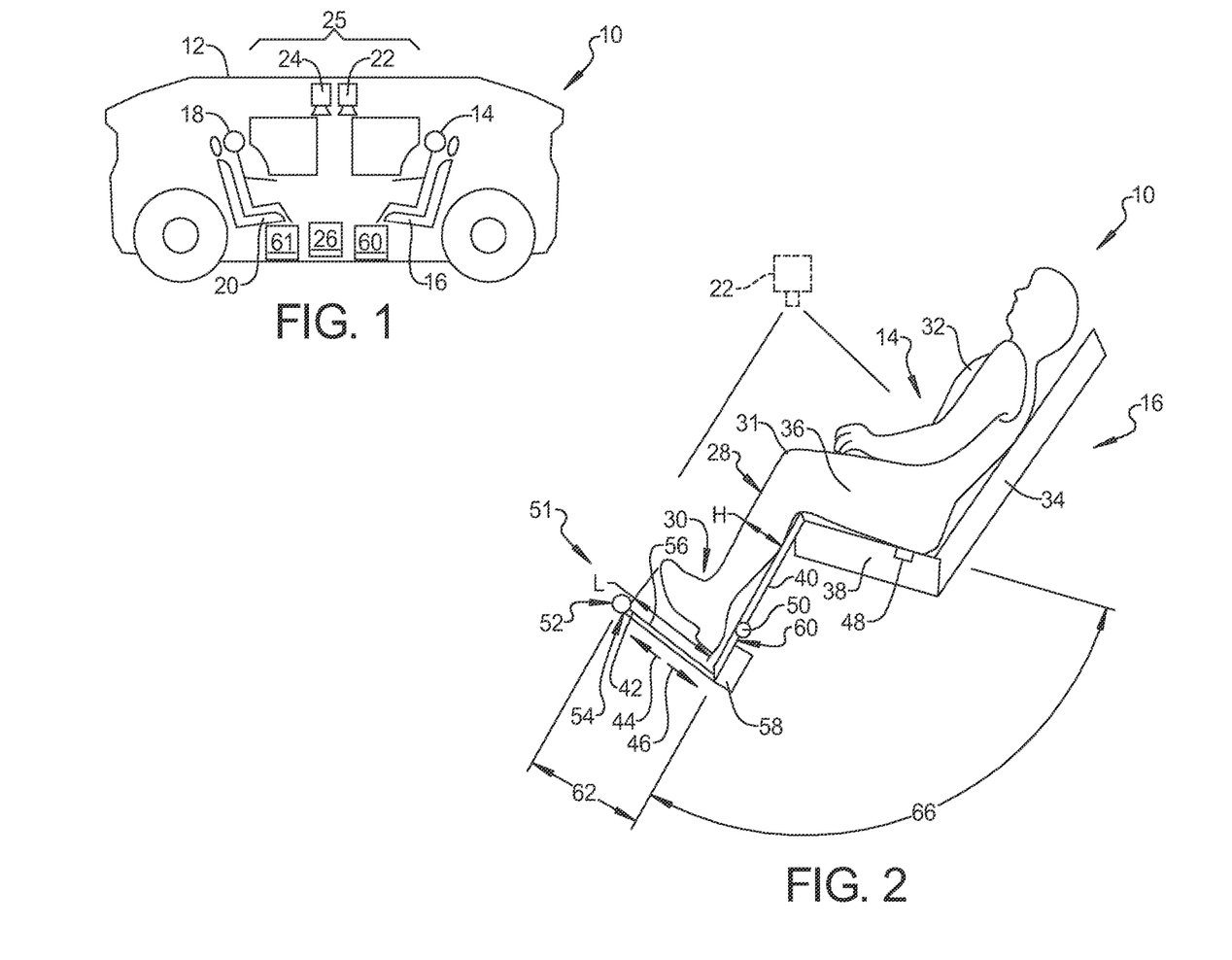
FIG. 1 is a side elevational view of a vehicle having a restraint system to prevent knee hyperextension according to an exemplary aspect.
FIG. 2 is a side elevational view of a vehicle seat having a first safety restraint element of the restraint system to prevent knee hyperextension of FIG. 1 in a stowed position.

Referring to FIG. 1, a restraint system to mitigate or prevent knee hyperextension 10 is provided in a vehicle 12 which may include but is not limited to an autonomous vehicle including but not limited to shared autonomous vehicles (SAVs) which is shown as an example in FIG. 1, pooled shared autonomous vehicles (PSAVs), shuttle buses, an engine powered vehicle or a battery electric vehicle. A driver or operator as a first occupant 14 is seated in at least one first vehicle seat 16, and one or more passengers as a second occupant 18 are seated in at least one second vehicle seat 20 which may be oppositely facing toward the first vehicle seat 16 as shown or may be facing in a same direction as the first vehicle seat 16.

The restraint system to prevent knee hyperextension 10 provides multiple devices used for recognition of a size and location of the vehicle occupants including the first occupant 14 and the second occupant 18. The restraint system to prevent knee hyperextension 10 includes multiple in-vehicle cameras which generate in-vehicle camera data relating to occupant position, occupant movement and occupant size detected over time. The multiple in-vehicle cameras include a first camera 22 directed toward the first vehicle seat 16 and a second vehicle camera 24 directed toward the second vehicle seat 20. The first and second vehicle cameras 22, 24 are similar to in-vehicle directed cameras provided on many different vehicle designs and provide optimized appearance details.

Control of the restraint system to prevent knee hyperextension 10 may be performed using an individual device such as a processor, a software component or an on-board computer, hereinafter collectively referred to as a computer 26. The computer 26 may be deployed in the vehicle 12 with perception capabilities. The computer 26 is a non-generalized, electronic control device having a preprogrammed digital controller or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

Referring to FIG. 2 and again to FIG. 1, in the exemplary position shown the first vehicle camera 22 is directed at a minimum at lower portions of the vehicle occupants such as lower legs 28 and feet 30 of the first occupant 14 below first and second knee joints 31 (only a left knee joint 31 is visible in this view). The second vehicle camera 24, not shown in this view for clarity, is similarly directed at the second occupant 18 and is therefore not further discussed herein. When seated on the first vehicle seat 16, a torso 32 of the first occupant 14 is supported on a backrest 34, occupant upper legs 36 are supported on a seat base 38, and the lower legs 28 and the feet 30 may be supported on a leg-rest 40.

According to several aspects, a foot-rest 42 may also be provided, which is fixed at one end to the leg-rest 40 and is oriented substantially transverse to the leg-rest 40. The foot-rest 42 and one of multiple extending links 56 discussed below, according to several aspects are extendable in an outward direction 44 or retractable in an inward (toward the leg-rest 40) direction 46. Data from the first vehicle camera 22 and the second vehicle camera 24 in addition to data from additional sensors such as a seat pressure (weight) sensor 48 sensing occupant weight and a contact sensor 50 sensing if the lower legs 28 and the feet 30 are in contact with the leg-rest 40 and the foot-rest 42 are sent to the computer 26.

In an exemplary seated position of the first occupant 14 on the first vehicle seat 16 shown, a first safety restraint system 51 includes a first safety restraint element 52 initially positioned at a free end 54 of the foot-rest 42. The first safety restraint element 52 may define a net shown in greater detail in reference to FIG. 4 which may include a woven material such as a polymeric material, and includes opposed ones of the extending links 56 only one of which is visible in this view, which connect the first safety restraint element 52 to a restraint actuator 58 which is fixed to a back facing surface 60 of the leg-rest 40 so the restraint actuator 58 is normally out-of-sight to occupants of the vehicle 12. The restraint actuator 58 may define a pyro technic actuator, a torsion spring, a solenoid and the like. In a rolled state of the first safety restraint element 52 shown, the first safety restraint element 52 is positioned on the free end 54 of the foot-rest 42 and is connected with the restraint actuator 58 using the extending links 56 which may define expanding links.

Figure 6:
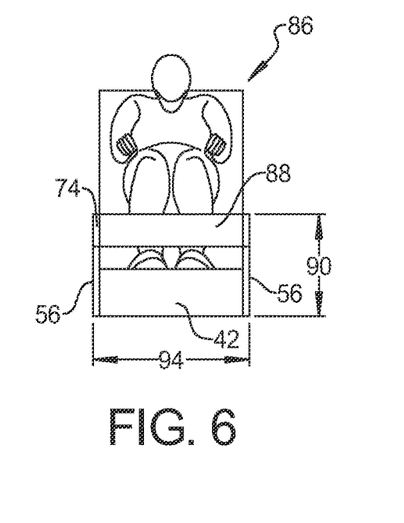
FIG. 6 is a front elevational view looking rearward of the second safety restraint element if FIG. 5.
Figure 7:
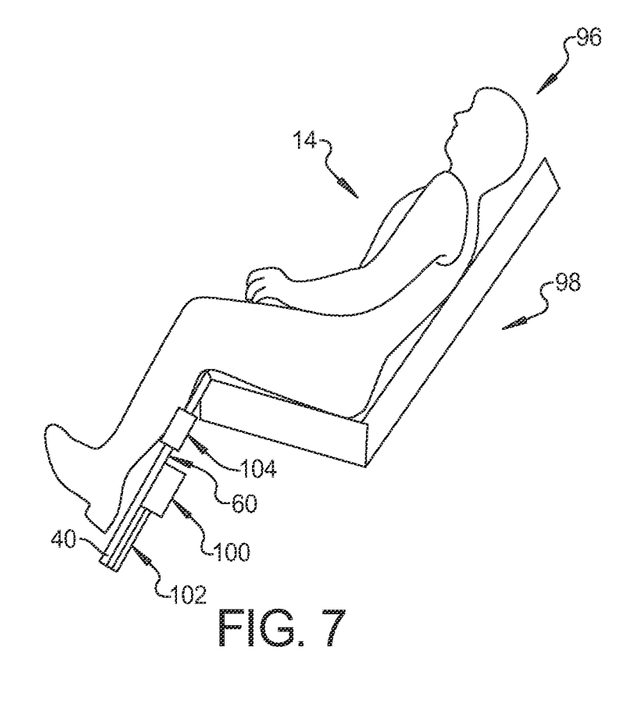
FIG. 7 is a side elevational view of a vehicle seat having a third safety restraint element of a restraint system to prevent knee hyperextension in a stowed position.

With continued reference to FIG. 2 and again to FIG. 1, the activation of the restraint actuator 58 such as by one or more crash sensors 61 located in the vehicle 12 activates the first safety restraint element 52. According to several aspects, the first and second vehicle cameras 22, 24 define an in-vehicle occupant detection system 25. According to further aspects, the in-vehicle occupant detection system 25 further includes the seat pressure sensor 48 and the contact sensor 50. Initially, using a feedback signal from the in-vehicle occupant detection system 25, including the first vehicle camera 22 and the second vehicle camera 24, a potential location of the lower legs 28 and the feet 30 are determined. According to further aspects, the seat pressure sensor 48 and the contact sensor 50 may also provide input signals to the in-vehicle occupant detection system 25 to assist in determining potential positions and locations of the lower legs 28 and the feet 30. The lower legs 28 may be positioned side-by-side as shown in reference to FIG. 6 or may have one of the lower legs crossed over the other. A length of the lower legs 28 is therefore accommodated, for example for occupants of average or below average height to occupants of above average height. In addition, a length of the feet 30 between occupants may vary, therefore a length of the extending links 56 according to several aspects may be extended in the outward direction 44 to accommodate longer feet 30 or retracted in the inward (toward the leg-rest 40) direction 46 to accommodate occupants having shorter feet 30.

Figure 3:
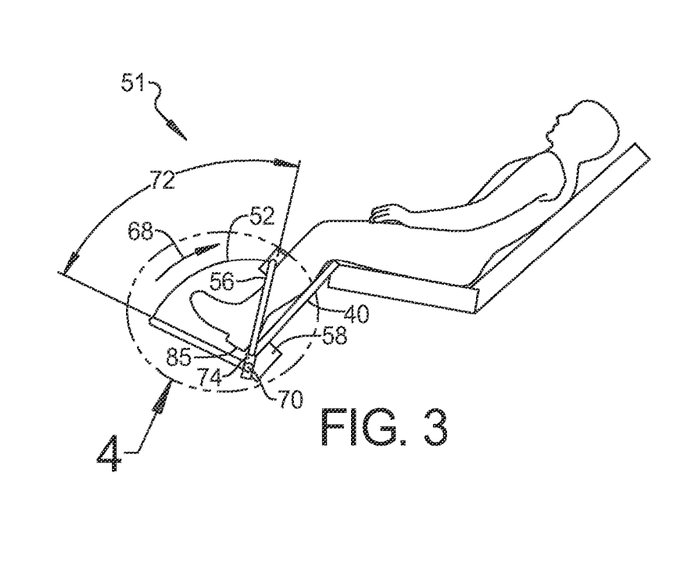
FIG. 3 is a side elevational view modified from FIG. 2 to present a first safety restraint element of FIG. 2 in a fully deployed position.

From the potential location a length 62 of the extending links 56 is adjusted. For example the length 62 may be adjusted using hydraulic, pneumatic, or electrical systems, (not shown) to accommodate a length L of the feet 30 so that the restraint element 52 can clear the feet 30 without being entrapped by the feet 30. A rotation angle 72 shown below in reference to FIG. 3 is adjusted to accommodate a height H of the lower legs 28 above the leg rest 40. An angle of rotation 66 of the lower legs 28 defines a range of rotation of the seat base 38 with respect to the leg-rest 40 between a seat upright position shown in FIG. 2 and a seat reclined position shown in FIG. 3 below.

Referring to FIG. 3 and again to FIGS. 1 and 2, activation of the restraint actuator 58 is initiated by signals from vehicle crash sensors such as one of multiple vehicle crash sensors 61 described in reference to FIG. 1, or by other crash sensors (not shown) positioned in other locations of the vehicle 12. The restraint actuator 58 rotates the extending links 56. Because the first safety restraint element 52 is connected to the extending links 56, rotation of the extending links 56 also co-rotates the first safety restraint element 52 in a direction of rotation 68, clockwise in the view of FIG. 3, about an axis of rotation 70, which sweeps the first safety restraint element 52 over the feet 30 of the occupant 14. At the end of the sweep and at an approximate angle 72 defining an extended position of the first safety restraint element 52, the first safety restraint element 52 directly contacts and envelopes the lower legs 28 of the occupant 14, forcing the lower legs 28 and the feet 30 into direct contact with the leg-rest 40. Also, at the extended position of the first safety restraint element 52, the extending links 56 are locked in position using a locking mechanism 74 which prevents release of the lower legs 28 and the feet 30 from the leg-rest 40. In the extended position the first safety restraint element 52 restricts forward motion of the lower legs 28 and the feet 30 away from the contact position with the leg-rest 40 as the vehicle 12 decelerates, which prevents hyperextension of the knees 31 forward of the vehicle seat 16. It is noted the vehicle seat 16 is shown having the backrest 34 reclined with respect to the position of the backrest 34 shown in FIG. 1. The entire restraint system to mitigate or prevent knee hyperextension 10 is attached to vehicle seat 16 allowing the vehicle seat 16 to swivel at any angle, forward, backward, sideward or any angle in between with respect to a vehicle motion direction.

Referring to FIG. 4 and again to FIG. 3, the first safety restraint element 52 is shown in a fully deployed position. The first safety restraint element 52 may define a net 76 which may include a woven material such as a polymeric material. The first safety restraint 52 is initially in a rolled condition positioned at the end 54 of the foot-rest 42. A first attachment member 78 and a second attachment member 80 rotatably connect restraint element 52 with individual ones of the extending links 56, allowing rotation of the first safety restraint element 52 about the axis of rotation 70. The other end 82 is attached to the foot-rest 42. A rolled portion 82 at the free end 54 of the extending links 56 of the first safety restraint element 52 provides additional length of the net 76 to allow for extension or retraction of the extending links 56 to accommodate different lengths of the lower legs 28 shown and described in reference to FIG. 2. Rotation of the extending links 56 in the direction of rotation 68 will unroll the first safety restraint element, sweeping it over the feet 30. A width 84 of the first safety restraint element 52 is predetermined and is substantially equal to a similar width of the foot-rest 42. The locking mechanism 74 includes an external release device 85 such as a button shown in reference to FIG. 3 to release the extending links 56 for quick egress at the end of the event, which may be operated by the occupant 14 or a first responder (not shown).

Figure 4:
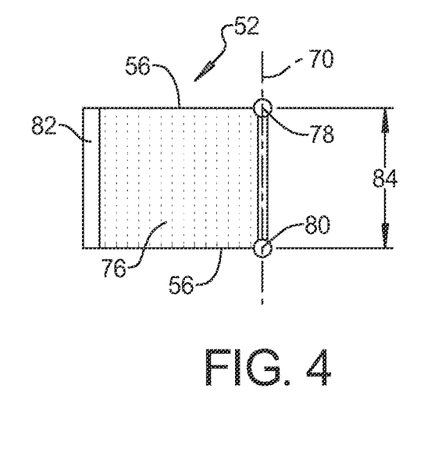
FIG. 4 is a front elevational view of the first safety restraint element of the aspect of FIG. 2.

Referring to FIG. 5 and again to FIGS. 1 through 4, a second safety restraint system 86 may be used in place of the first safety restraint system 51 and includes similar features noted in reference to FIGS. 2 through 4, therefore only the differences will be further described herein. A second safety restraint element 88 of the second safety restraint system 86 is used in place of the first safety restraint element 52 and may define a belt which in a normally stowed state not shown but similar to the configuration shown in FIG. 2 is positioned proximate the feet 30 of the occupant 14 at the free end 54 of the foot-rest 42. Similar to the first safety restraint element 52 the second safety restraint element 88 may include a woven material such as a polymeric material, and is connected to the opposed extending links 56 shown in greater detail in reference to FIG. 6, which connect the second safety restraint element 88 to the restraint actuator 58 which is fixed to the back facing surface 60 of the leg-rest 40 so the restraint actuator 58 is normally out-of-sight to occupants of the vehicle 12. In the rolled state of the second safety restraint element 88 not shown, the second safety restraint element 88 is connected with the restraint actuator 58 using the two extending links 56 which as previously noted may define expanding links.

Figure 5:
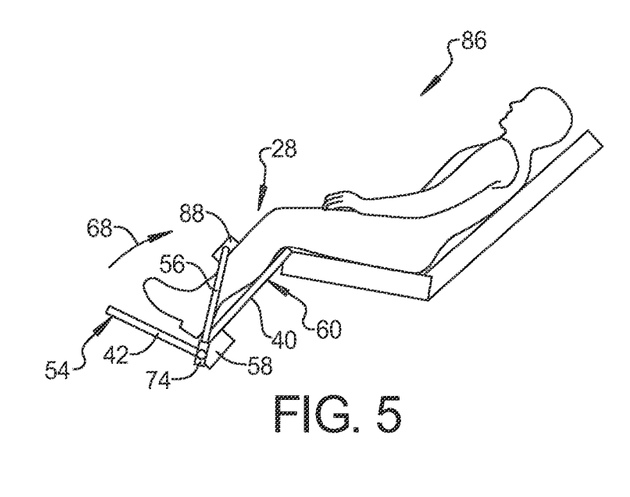
FIG. 5 is a side elevational view modified from FIG. 2 to present a second safety restraint element in a fully deployed position.

Referring to FIG. 6 and again to FIG. 5, the second safety restraint element 88 is shown in a deployed and locked state. Initially, from the stowed state a height 90 of the second safety restraint element 88 may be adjusted by adjusting the length 62 of the two extending links 56 as described in reference to FIG. 2 using data collected from the in-vehicle occupant detection system 25 described in detail in reference to FIG. 1 such that during deployment the second safety restraint element 88 is not entrapped by the feet 30. A length 94 of the second safety restraint element 88 is substantially equal to a width of the foot-rest 42. When the restraint actuator 58 is actuated, the second safety restraint element 88 rotates in the direction of rotation 68 until the second safety restraint element 88 contacts the lower legs 28 of the occupant 14 below the knee joints 31, and the locking mechanism 74 is engaged.

Referring generally to FIGS. 7 through 10 a third safety restraint system 96 is modified from the second safety restraint system 86 and the first safety restraint system 51 as follows, therefore only the differences will be further discussed. The two extending links 56 are omitted from a vehicle seat 98 for the third safety restraint system 96. The foot-rest 42 is not shown in this aspect but could be used if desired. A restraint actuator 100 is fixed to the back facing surface 60 of the leg-rest 40 so the restraint actuator 100 is normally out-of-sight to occupants of the vehicle 12. A U-shaped bar 102 having extending links is displaced by actuation of the restraint actuator 100. A third safety restraint element 104 defining a rolled belt, similar to the second safety restraint element 88, is connected to the U-shaped bar 102 and an opposite end of the third safety restraint element 104 is positioned at a first side 118 of the leg-rest 40 shown in detail in reference to FIG. 8.

The restraint actuator 100 of the third safety restraint system 96 is activated by at least one crash sensor such as the vehicle crash sensors including the exemplary one of the multiple crash sensors 61 shown in reference to FIG. 1, or by other crash sensors (not shown) positioned in other locations of the vehicle 12 discussed in reference to FIG. 3.

Figure 8:
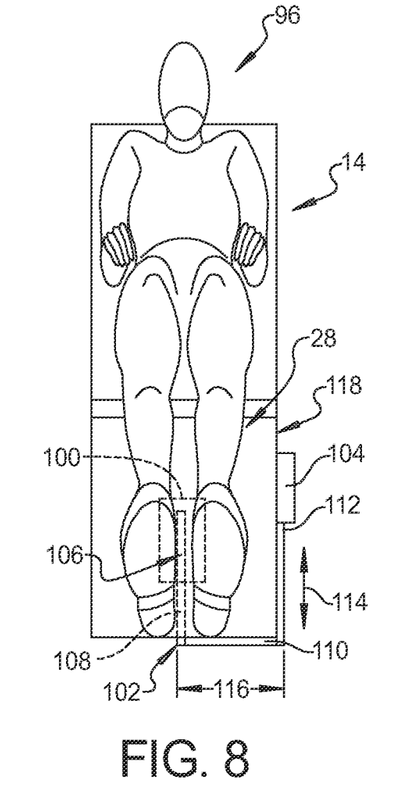
FIG. 8 is a front elevational view looking rearward of the third safety restraint element of FIG. 5.

Referring more specifically to FIG. 8, when actuated, the restraint actuator 100 rotates the U-shaped bar 102 about a central axis 106 of a first link 108 connected with the restraint actuator 100, shown in phantom in this view. Dimensions of the expandable portions of the extending links of the U-shaped bar 102 such as the first link 108, a second link 110 and a third link 112 connected to the third safety restraint element 104, including a height 114 of the first link 108 and the third link 112, and a width 116 of the second link 110 are adjusted to avoid interference with occupant body parts based on positions of the lower legs 28 and the feet 30 and dimensions captured by the internal occupant detection system 25 discussed in reference to FIG. 1. The restraint actuator 100 rotates the U-shaped bar 102 about the central axis 106 of the first link 108 which sweeps the third safety restraint element 104 from the stowed position across the lower legs 28 of the occupant 14, shown in greater detail in reference to FIGS. 9 and 10. The U-shaped bar 102 adjustment and rotation can be performed simultaneously or alternatively in any order, in a single step or in multiple steps, based on space availability. The third safety restraint element 104 is connected at a first end to a first side 118 of the leg-rest 40 and is initially positioned in a retracted and stowed position on the first side 118 of the leg-rest 40.

Referring more specifically to FIG. 9 and again to FIG. 8, the third safety restraint element 104 is shown during its sweep in a direction of rotation 120 across the lower legs 28 of the occupant 14. A connecting end 122 of the third link 112 attached to a second end of the third safety restraint element 104 pulls the third safety restraint element 104 across the lower legs 28.

Figure 9:
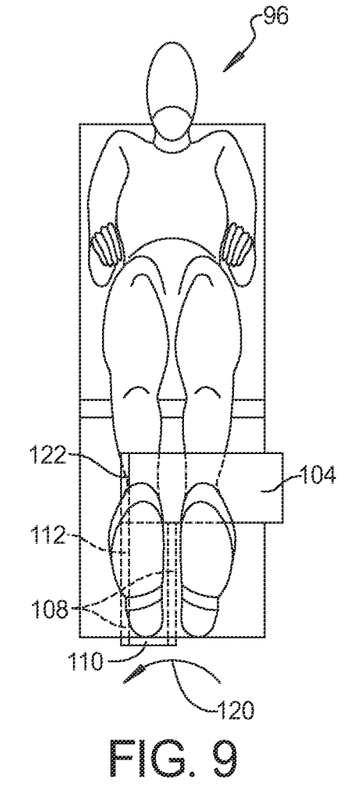
FIG. 9 is a front elevational view looking rearward of the third safety restraint element of FIG. 5 in a partially deployed position.
Figure 10:
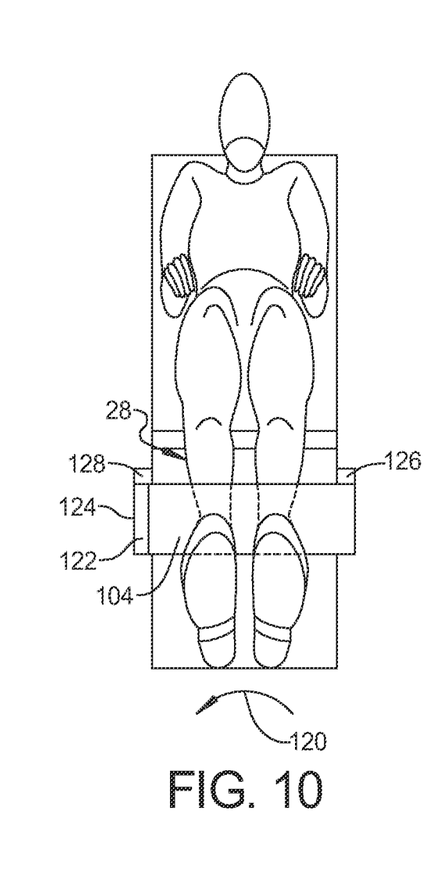
FIG. 10 is a front elevational view looking rearward of the third safety restraint element of FIG. 5 in a fully deployed and locked position.

Referring more specifically to FIG. 10 and again to FIGS. 8 and 9, at the end of the sweep of the U-shaped bar 102 shown, the third link 112 of the U-shaped bar 102 is captured by a locking mechanism 124, effectively belting the lower legs 28. After locking, if required, the third safety restraint element 104 can be tightened using a pre-tensioner/retractor mechanism 126. A quick release mechanism 128 is also provided to release the third link 112 and thereby the third safety restraint element 104 from the locking mechanism 124 for subsequent evacuation of the occupant 14.

Figure 11:
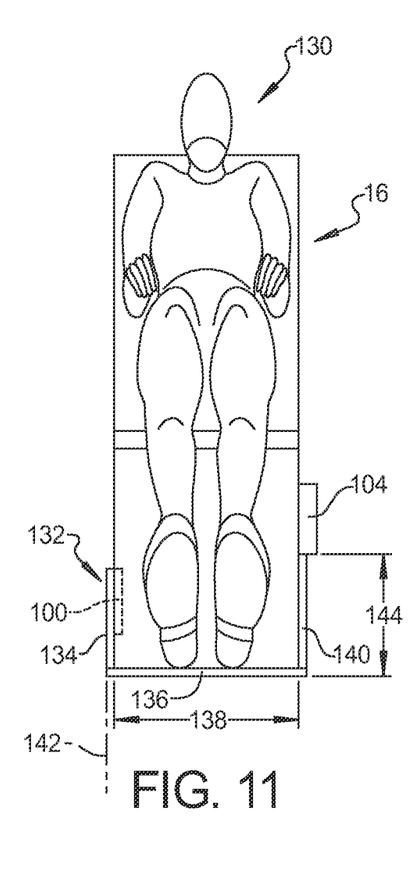
FIG. 11 is a front elevational view looking rearward of a vehicle seat having a fourth safety restraint element of a restraint system to prevent knee hyperextension in a stowed position.

Referring to FIG. 11 and again to FIGS. 7 through 10, a fourth safety restraint system 130 is modified from the third safety restraint system 96 to include a U-shaped bar 132 in place of the U-shaped bar 102. The U-shaped bar 132 includes a first link 134 connected to the restraint actuator 100, a second link 136 extending beyond a total width 138 of the vehicle seat 16, and a third link 140 positioned on an opposite side of the vehicle seat 16 with respect to the first link 134 in a stowed position of the U-shaped bar 132 shown. The first link 134 rotates about an axis of rotation 142 in this aspect during operation of the restraint actuator 100. An adjustable height 144 of the first link 134 and of the third link 140 may be equal to the adjustable height 114 of the third link 112 of the third safety restraint system 96 shown in reference to FIG. 8.

Referring generally to FIGS. 12 through 17, a rotating or spring actuated first mechanism 148 deploys a padded rope/belt 150 by swinging from a stowed position behind or beneath the leg-rest 40, outward and beyond the feet 30. Deployment is calibrated depending on anthropometry captured by internal sensors such as using the in-vehicle occupant detection system 25 discussed in reference to FIG. 2. Rotation of the first mechanism 148 continues to swing the padded rope/belt 150 around the feet 30 placing the padded rope/belt 150 in a position in front of the lower legs 28.

Figures 12, 14:
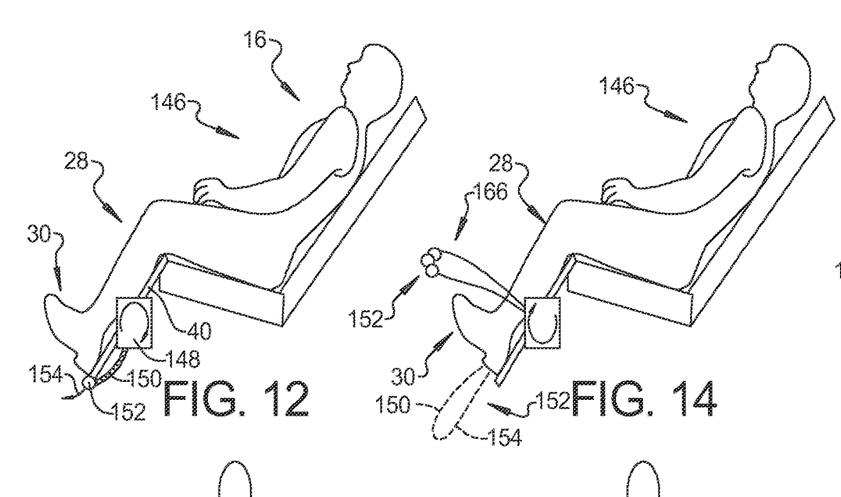
FIG. 12 is a side elevational view of a vehicle seat having a fifth safety restraint element of a restraint system to prevent knee hyperextension in a stowed position.
FIG. 14 is a side elevational view of the fifth safety restraint element of FIG. 12 in a partially deployed position.

Referring more specifically to FIG. 12, in the stowed position the padded rope/belt 150 and the first mechanism 148 are predominantly positioned beneath or behind the leg-rest 40 and out of sight to occupants of the vehicle 12. According to several aspects, the padded rope/belt 150 includes at least one weight member 152 fixed to the padded rope/belt 150 to influence the padded rope/belt 150 to swing in a first arc of rotation 154 upon actuation of the first mechanism 148.

Referring to FIG. 13 and again to FIG. 12, according to several aspects, the first mechanism 148 defines one mechanism of a two-mechanism assembly. According to several aspects, the first mechanism 148 may be fixed to a first side 149 or back portion of the leg-rest 40 and connects to a first end of the padded rope/belt 150. A second mechanism 156 defines a second mechanism of the two-mechanism assembly and may be fixed to a second side 157 or back portion of the leg-rest 40 and connects to a second end 158 of the padded rope/belt 150. The second end 158 of the padded rope/belt 150 extends in a second arc of rotation 161 when the second mechanism 156 deploys. According to several aspects, the weight member 152 may define a first weight member 160, a second weight member 162 and a third weight member 164.

Figure 13:
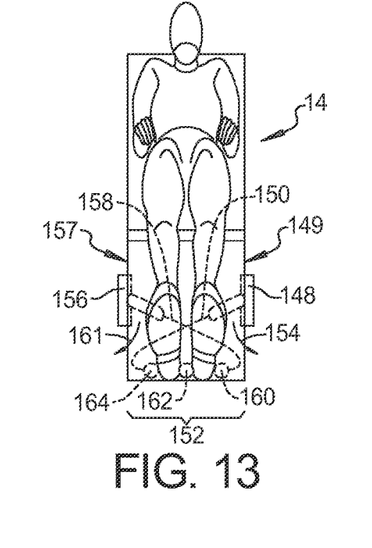
FIG. 13 is a front elevational view looking rearward of the fifth safety restraint element of FIG. 12.

Referring to FIG. 14 and again to FIGS. 12 and 13, during deployment of the padded rope/belt 150, the weight member 152 rotates to a fully extended position 166 above the feet 30 and in front of the lower legs 28.

Referring to FIG. 15 and again to FIGS. 12 through 13, the padded rope/belt 150 reaches an engaged position 168 which may have the second weight member 162 positioned between the lower legs 28, the first weight member 160 positioned to a first side of one of the lower legs 28 such as a left leg of the occupant 14, and the third weight member 164 positioned to a second side of one of the lower legs 28 such as a right leg of the occupant 14.

Figure 15:
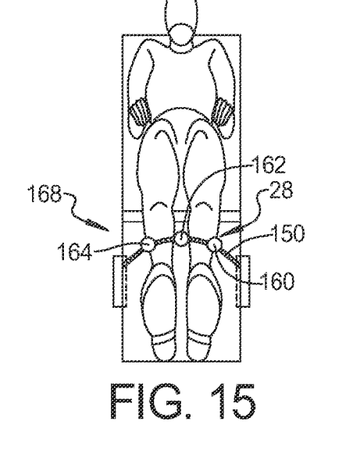
FIG. 15 is a front elevational view looking rearward of the fifth safety restraint element of FIG. 12 in a fully deployed position.

Referring to FIG. 16 and again to FIGS. 13 through 15, upon the padded rope/belt 150 reaching the engaged position 168 shown in FIG. 15, the first mechanism 148 and the second mechanism 156 apply a tightening force to the padded rope/belt 150 to pull the lower legs 28 in a direction 170 toward the leg-rest 40 using a one-way lock 172 based on leg/feet dimensions and positions determined from the in-vehicle occupant detection system 25 discussed in reference to FIG. 2.

Figure 16:
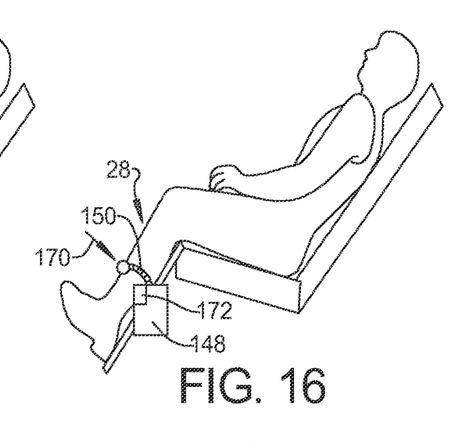
FIG. 16 is a side elevational view of the fifth safety restraint element of FIG. 12 in a fully deployed and locked position.
Figure 17:
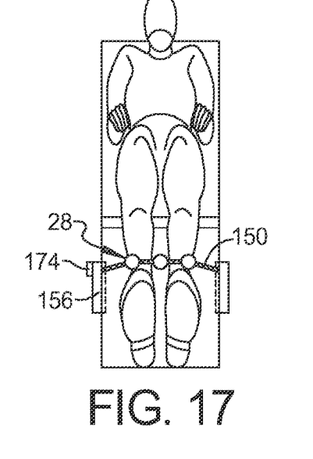
FIG. 17 is a front elevational view looking rearward of the fifth safety restraint element of FIG. 12 in a fully deployed and locked position having a release device to release the safety restraint element.

Referring to FIG. 17 and again to FIGS. 15 and 16, the padded rope/belt 150 remains in the tightened position due to a one-way lock 172 until a release device 174 is actuated allowing the lower legs 28 and the feet 30 as well as the occupant 14 to be released from the vehicle seat 16.

According to several aspects, a restraint system of the present disclosure may include at least one vehicle seat of a vehicle. The vehicle seat may include a leg-rest supporting lower legs and feet of an occupant of the vehicle seat. An in-vehicle occupant detection system identifies potential positions and locations of the lower legs and the feet of the occupant. A restraint actuator is connected to the vehicle seat. A safety restraint element is extended by actuation of the restraint actuator from a stowed position proximate to the leg-rest into an engaged position wherein the safety restraint element contacts and restrains the lower legs and the feet of the occupant against the leg-rest, mitigating against occupant knee hyperextension due to leg straightening at an occupant knee joint.

According to several aspects, the method of the present disclosure provides multiple improvements including a restraint system which is unobtrusive when not deployed. The restraint system to prevent knee hyperextension 10 is attached to the vehicle seat and moves/rotates with the seat, and therefore automatically operates with any recline/swivel seat positions as well as with different positions and orientations of occupant legs and feet, including with straight legged or cross-legged seating postures. The restraint system to prevent knee hyperextension 10 also provides occupant protection without the use of an airbag.

What is claimed is:

1. A vehicle seat restraint system, comprising:
    a vehicle seat of a vehicle, the vehicle seat including a leg-rest supporting lower legs and a foot-rest connected to the leg-rest and supporting feet of an occupant of the vehicle seat;
    an in-vehicle occupant detection system identifying positions of the lower legs and the feet of the occupant;
    a restraint actuator connected to the vehicle seat;
    a safety restraint element extended by actuation of the restraint actuator from a stowed position proximate to the leg-rest into an engaged position wherein the safety restraint element contacts and restrains the lower legs and the feet of the occupant against the leg-rest, mitigating against occupant knee hyperextension due to leg straightening at an occupant knee joint;

a feedback from the in-vehicle occupant detection system is applied to identify a potential location of the lower legs and the feet; and an extending link connected to the foot-rest, a length of the extending link and an angle of rotation of the extending link adjusted applying the potential location to accommodate a height of the feet and a position of the lower legs.

2. The vehicle seat restraint system of claim 1, wherein: the restraint actuator defines one of a pyro technic actuator, a torsion spring and a solenoid fixed to a back facing surface of the leg-rest; and a crash sensor located in the vehicle activating the restraint actuator.

3. The vehicle seat restraint system of claim 2, including: first and second extending links connected to the restraint actuator, adjusted in length using data retrieved from the in-vehicle occupant detection system and rotated by activation of the restraint actuator;

the safety restraint element defining a net is initially positioned in a rolled condition at an end of the foot-rest; and rotation of the first and second extending links in a first rotational direction unrolls the safety restraint element, sweeping the safety restraint element over the feet and into contact with the lower legs of the occupant.

4. The vehicle seat restraint system of claim 2, including: first and second extending links connected to the restraint actuator, adjusted in length using data retrieved from the in-vehicle occupant detection system and rotated by activation of the restraint actuator;

the safety restraint element defining a flexible belt connected at opposite ends to the first and second extending links and positioned below the feet in a stowed position at an end of the foot-rest; and rotation of the first and second extending links in a first rotational direction co-rotates the safety restraint element, sweeping the safety restraint element over the feet and into contact with the lower legs of the occupant.

5. The vehicle seat restraint system of claim 2, including: a U-shaped bar having a first link connected to the restraint actuator, a second link connected to the first link and a third link connected to the second link, the U-shaped bar rotated about an axis of rotation of the first link by activation of the restraint actuator;

the restraint actuator connected to a rear face of the leg-rest and at a location centrally disposed between the lower legs of the occupant;

a height of the first link and the third link are adjusted, and a width of the second link is adjusted using data retrieved from the in-vehicle occupant detection system;

a rolled belt defining the safety restraint element connected to a side of the leg-rest at a first end of the safety restraint element and connected to the third link at a second end of the safety restraint element; and the restraint actuator rotates the U-shaped bar about a central axis of the first link to sweep the safety restraint element across the lower legs of the occupant.

6. The vehicle seat restraint system of claim 1, including a locking device releasably locking the safety restraint element in the engaged position.

7. The vehicle seat restraint system of claim 6, including a release device actuated to release the locking device and thereby releasing the safety restraint element from the engaged position and allowing egress of the occupant out of the vehicle seat.

8. The vehicle seat restraint system of claim 1, wherein the in-vehicle occupant detection system includes at least one of a vehicle camera, at least one seat pressure sensor and at least one seat contact sensor.

9. A vehicle seat restraint system, comprising:
a vehicle seat of a vehicle, the vehicle seat including a leg-rest supporting lower legs and a foot-rest connected to the leg-rest and supporting feet of an occupant of the vehicle seat;

an in-vehicle occupant detection system identifying positions of the lower legs and the feet of the occupant;

a restraint actuator connected to the vehicle seat, wherein the restraint actuator defines one of a pyro technic actuator, a torsion spring and a solenoid fixed to a back facing surface of the leg-rest;

a safety restraint element extended by actuation of the restraint actuator from a stowed position proximate to the leg-rest into an engaged position wherein the safety restraint element contacts and restrains the lower legs and the feet of the occupant against the leg-rest, mitigating against occupant knee hyperextension due to leg straightening at an occupant knee joint;

a crash sensor located in the vehicle activating the restraint actuator;

a U-shaped bar having a first link connected to the restraint actuator and positioned at a first side of the leg-rest, a second link connected to the first link and a third link connected to the second link and positioned at a second side of the leg-rest at the stowed position of the safety restraint element, wherein a height of the first link and the third link is adjusted, and a width of the second link is adjusted using data retrieved from the in-vehicle occupant detection system; and a rolled belt defining the safety restraint element connected to the third link, wherein the restraint actuator rotates the U-shaped bar about a central axis of the first link and across the lower legs to sweep the safety restraint element from the stowed position across the lower legs of the occupant.

10. A vehicle seat system mitigating occupant knee extension, comprising:
a vehicle seat having a leg-rest supporting lower legs and feet of an occupant of the vehicle seat;

an in-vehicle occupant detection system having at least one camera directed toward the occupant and generating camera signals identifying positions of the lower legs, a length of the lower legs and a size of the feet of the occupant;

at least one restraint actuator connected to the leg-rest of the vehicle seat;

a safety restraint element having a position of the safety restraint element adjusted using data collected from the in-vehicle occupant detection system, wherein the safety restraint element includes a padded rope/belt swung by the restraint actuator from a stowed position behind or beneath the leg-rest outward and beyond the feet, and at least one weight member connected to the padded rope/belt influencing the padded rope/belt to swing in a first arc of rotation;

the safety restraint element extended from a stowed position proximate to the leg-rest into an engaged position wherein the safety restraint element contacts and restrains the lower legs and the feet of the occupant against the leg-rest; and a locking device releasably locking the safety restraint element in the engaged position.

11. The vehicle seat system mitigating occupant knee extension of claim 10, wherein the camera is directed at lower portions of the occupant including the lower legs and the feet below knee joints of the occupant.

12. The vehicle seat system mitigating occupant knee extension of claim 10, including a crash sensor located in the vehicle, wherein activation of the crash sensor triggers the restraint actuator to extend the safety restraint element.

13. The vehicle seat system mitigating occupant knee extension of claim 10, including a contact sensor of the in-vehicle occupant detection system sensing if the lower legs and the feet are in contact with the leg-rest.

14. The vehicle seat system mitigating occupant knee extension of claim 10, wherein the restraint actuator includes:
- a first mechanism fixed to a first side of the leg-rest and connected to a first end of the padded rope/belt; and
- a second mechanism fixed to a second side of the leg-rest and connected to a second end of the padded rope/belt.

15. The vehicle seat system mitigating occupant knee extension of claim 10, wherein the safety restraint element in the engaged position restrains the lower legs for any angle of rotation of the seat back with respect to the seat base between a seat upright position and a seat reclined position.

\* \* \* \* \*